US008994970B2

(12) United States Patent
Nakashima

(10) Patent No.: US 8,994,970 B2
(45) Date of Patent: Mar. 31, 2015

(54) INFORMATION PROCESSING APPARATUS, CONTROL METHOD, AND STORAGE MEDIUM

(71) Applicant: Canon Kabushiki Kaisha, Tokyo (JP)

(72) Inventor: Kazuya Nakashima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/764,587

(22) Filed: Feb. 11, 2013

(65) Prior Publication Data

US 2013/0222829 A1 Aug. 29, 2013

(30) Foreign Application Priority Data

Feb. 24, 2012 (JP) ................................. 2012-038884

(51) Int. Cl.
*G06F 3/12* (2006.01)
*G06K 15/00* (2006.01)
*H04N 1/00* (2006.01)

(52) U.S. Cl.
CPC .......... *H04N 1/00278* (2013.01); *G06F 3/1204* (2013.01); *G06F 3/1254* (2013.01); *G06F 3/1285* (2013.01); *H04N 1/00206* (2013.01); *H04N 1/00228* (2013.01); *H04N 1/00233* (2013.01); *G06F 3/126* (2013.01); *H04N 1/00474* (2013.01); *H04N 2201/0075* (2013.01); *H04N 2201/0094* (2013.01)
USPC ....... 358/1.13; 358/1.14; 358/1.15; 358/1.16; 358/1.17

(58) Field of Classification Search
CPC .................. H04N 2201/0094; H04N 1/00244; H04N 1/00204; H04N 1/00464; H04N 1/00474; G06F 3/1288; G06F 3/1204
See application file for complete search history.

(56) References Cited

U.S. PATENT DOCUMENTS

| | | | | |
|---|---|---|---|---|
| 8,365,201 | B2 * | 1/2013 | Holan et al. | 719/321 |
| 8,836,981 | B2 * | 9/2014 | Takahashi | 358/1.15 |
| 2004/0227809 | A1 * | 11/2004 | Doi et al. | 347/260 |
| 2005/0088681 | A1 * | 4/2005 | Hosoda | 358/1.14 |
| 2006/0026600 | A1 * | 2/2006 | Yoshida | 719/310 |
| 2008/0309978 | A1 * | 12/2008 | Shirai | 358/1.16 |
| 2009/0044130 | A1 * | 2/2009 | Saluja | 715/750 |
| 2009/0063663 | A1 * | 3/2009 | Ikeno | 709/220 |
| 2009/0091787 | A1 * | 4/2009 | Naitoh | 358/1.15 |
| 2009/0094539 | A1 | 4/2009 | Wang | |
| 2009/0293070 | A1 | 11/2009 | Greeff | |

(Continued)

FOREIGN PATENT DOCUMENTS

| | | |
|---|---|---|
| CN | 101038537 A | 9/2007 |
| CN | 101964855 A | 2/2011 |

(Continued)

*Primary Examiner* — Satwant Singh
(74) *Attorney, Agent, or Firm* — Canon USA, Inc., IP Division

(57) ABSTRACT

An information processing apparatus includes a first selection unit configured to receive selection of a first device object having a first function of an output apparatus via a setting screen, a second selection unit configured to select a second device object having a second function of the output apparatus, which corresponds to the first device object selected by the first selection unit, and a setting unit configured to set both the first device object selected by the first selection unit and the second device object selected by the second selection unit to a virtual device object, wherein the first function differs from the second function.

15 Claims, 16 Drawing Sheets

(56) References Cited

U.S. PATENT DOCUMENTS

2009/0323090 A1* 12/2009 Megawa et al. ............... 358/1.9
2013/0212602 A1* 8/2013 Yamazaki .................... 719/321

FOREIGN PATENT DOCUMENTS

| EP | 2270671 A1 | 1/2011 |
| JP | 2006-215725 A | 8/2006 |

* cited by examiner

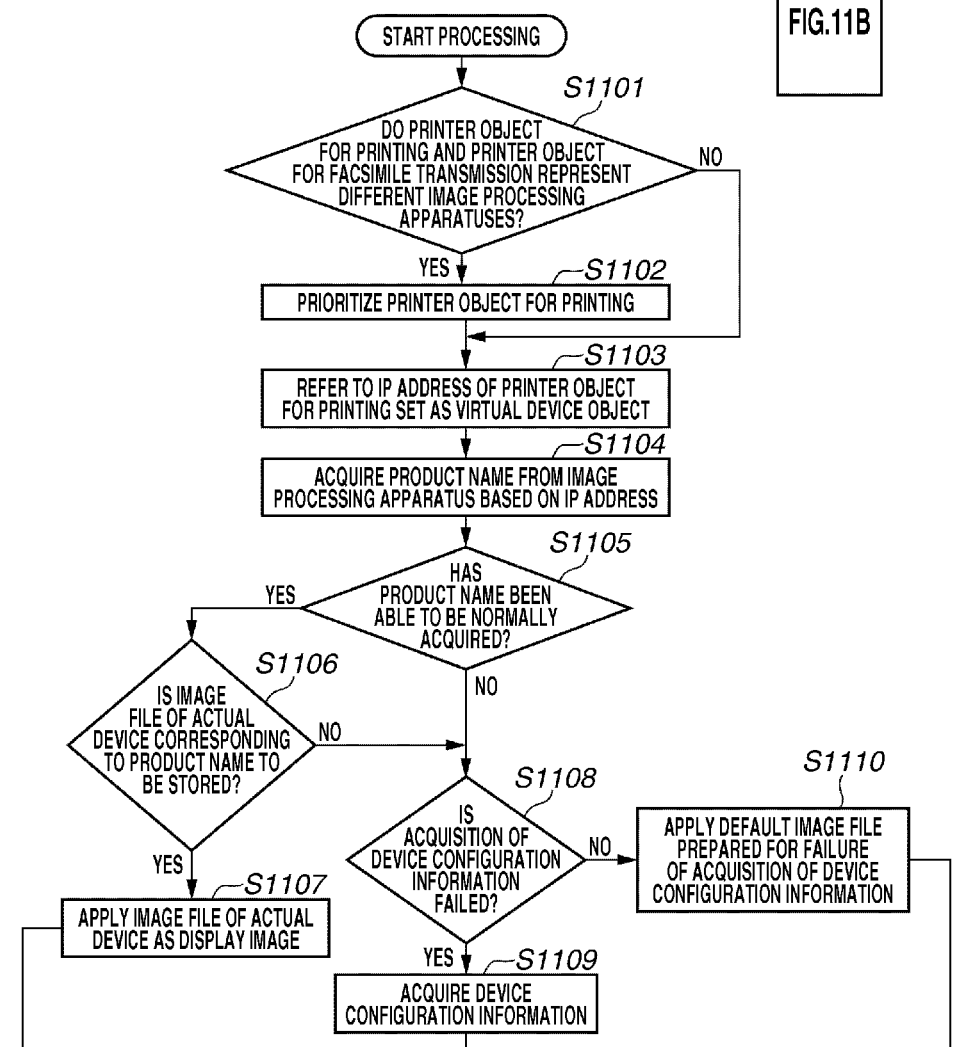

INFORMATION PROCESSING APPARATUS, CONTROL METHOD, AND STORAGE MEDIUM

BACKGROUND OF THE INVENTION

1. Field of the Invention

The present invention relates to an information processing apparatus, a control method, and a storage medium for issuing an instruction to perform output to an image processing apparatus.

2. Description of the Related Art

When an output instruction is issued to an image processing apparatus from a personal computer (PC), a document serving as an output target is opened with an application, to issue the output instruction via a printer object. Further, as another method for issuing an output instruction, printer objects corresponding to a plurality of different devices are integrated as a virtual device according to an integration instruction from a user. There is a technique for enabling distributed printing to a plurality of devices from the virtual device, as discussed in Japanese Patent Application Laid-Open No. 2006-215725.

However, in Japanese Patent Application Laid-Open No. 2006-215725, the user selects the printer objects to be integrated, and thus an operation for the selection may be a load on the user. If a plurality of output apparatuses is connected to a PC, for example, the load may be further increased in the technique discussed in Japanese Patent Application Laid-Open No. 2006-215725.

SUMMARY OF THE INVENTION

The present invention is directed to an information processing apparatus capable of reducing a setting load of a virtual device object obtained by integrating a plurality of printer objects.

According to an aspect of the present invention, an information processing apparatus includes a first selection unit configured to receive selection of a first device object having a first function of an output apparatus via a setting screen, a second selection unit configured to select a second device object having a second function of the output apparatus, which corresponds to the first device object selected by the first selection unit, and a setting unit configured to set both the first device object selected by the first selection unit and the second device object selected by the second selection unit to a virtual device object, wherein the first function differs from the second function.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
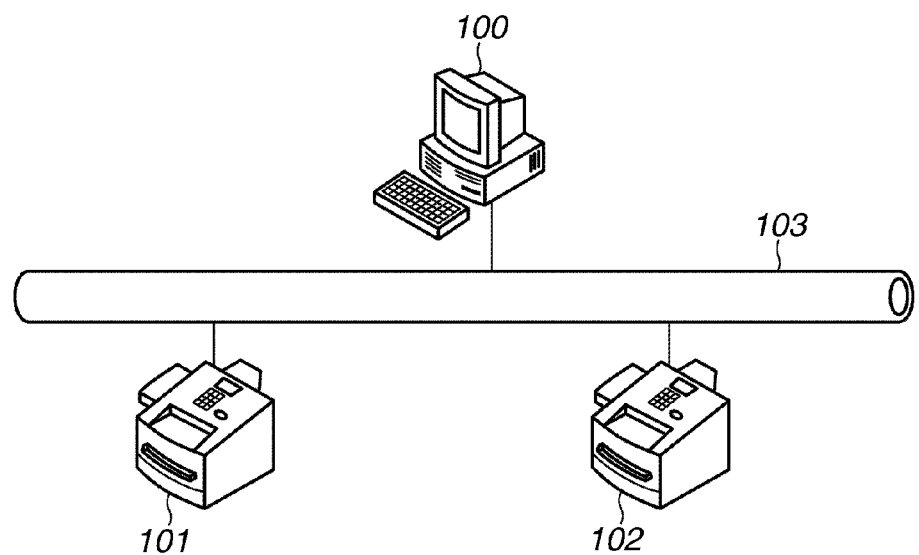
FIG. 1 illustrates a configuration of a data processing system according to an exemplary embodiment of the present invention.

FIG. 1 illustrates a configuration of a data processing system according to an exemplary embodiment of the present invention. This example illustrates a system in which an information processing apparatus, described below, and an image processing apparatus (also referred to as an output apparatus or a multifunction peripheral (MFP)), described below, can communicate with each other via a network. In FIG. 1, an information processing apparatus 100 is a personal computer usable by a user who instructs image processing apparatuses 101 and 102 to perform printing and facsimile transmission. Each of the image processing apparatuses 101 and 102 has a printer function, a facsimile function, a copy function, a scanner function, and a file sending function. A predetermined OS is installed on the information processing apparatus 100, and various types of applications for executing specified functional processing, which are not illustrated, are also installed thereon. The specified functional processing includes document processing, spreadsheet processing, presentation processing, image processing, and graphics processing. Each of the applications has its own data structure (file structure). Further, the OS can refer to an identifier of each file to issue a printing instruction to the corresponding application. A virtual device application 400 (FIG. 4) for using the image processing apparatus 101 (102) is installed on the information processing apparatus 100 according to the present exemplary embodiment. The virtual device application 400 has a function of issuing an output instruction such as a printing instruction or a facsimile transmission instruction to the image processing apparatus 101 (102) and a function of displaying a use status of the image processing apparatus 101 (102) and an execution status of an output job. The information processing apparatus 100 and the image processing apparatuses 101 and 102 are connected to a local area network (LAN) 103, and perform mutual communication of information via the LAN 103.

Figure 2:
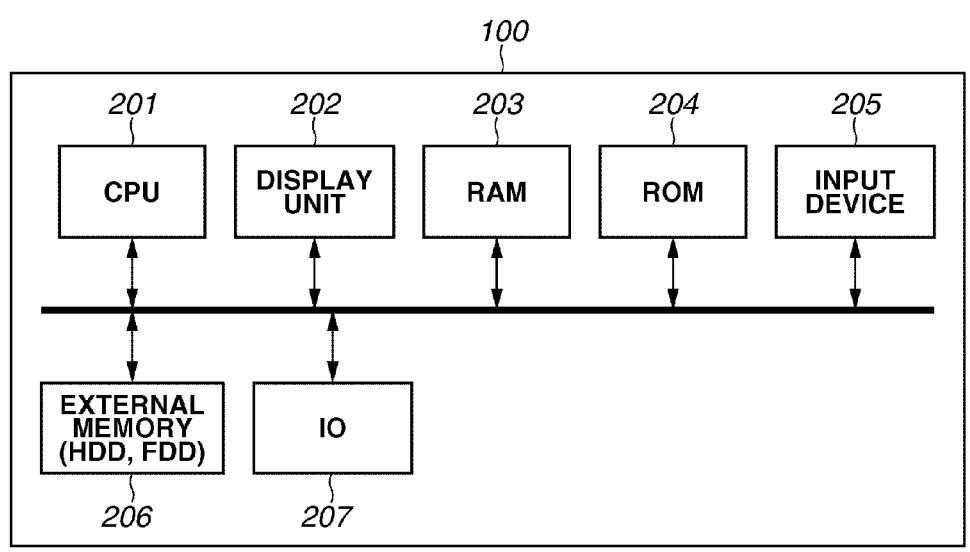
FIG. 2 illustrates a hardware configuration of an information processing apparatus.

FIG. 2 illustrates a hardware configuration of the information processing apparatus 100 illustrated in FIG. 1. In FIG. 2, the information processing apparatus 100 includes an input device 205 for receiving a user operation input, e.g., a keyboard or a pointing device. The information processing apparatus 100 further includes a display unit 202 for giving visual output information feedback to the user. The information processing apparatus 100 further includes a storage device random access memory (RAM) 203 storing various types of programs and execution information in the present exemplary embodiment, an external memory 206 such as a hard disk drive (HDD) or a flexible disk drive (FDD), and a read-only memory (ROM) 204. The information processing apparatus 100 further includes an interface device input/output (I/O) unit 207 for communicating with an external device, and includes a central processing unit (CPU) 201 for executing a program. A networking to a peripheral device may be wired or wireless. The information processing apparatus 100 is connected to the image processing apparatuses 101 and 102 via such an external device connection interface (I/F).

Figure 3:
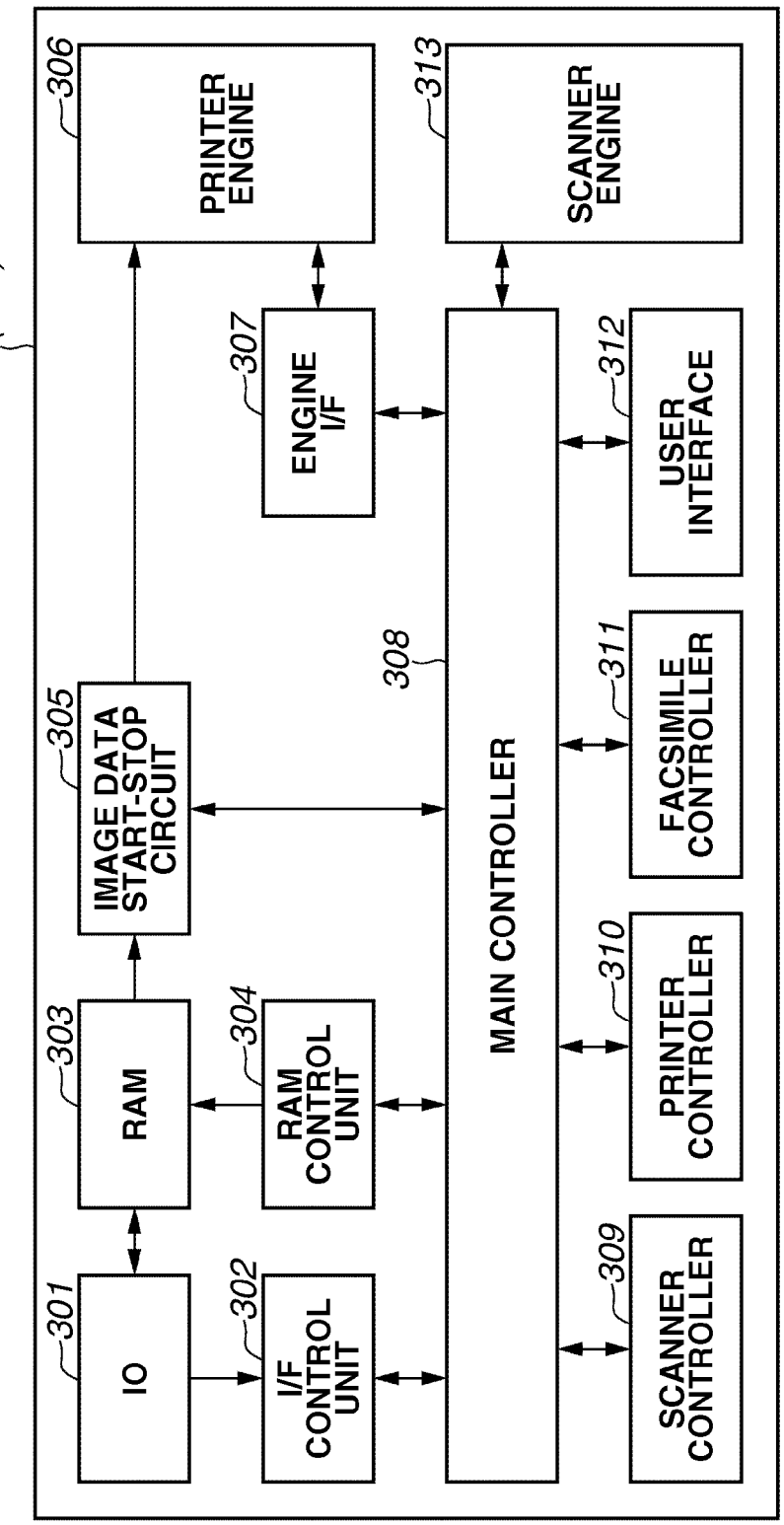
FIG. 3 illustrates a hardware configuration of an image processing apparatus.

FIG. 3 is a block diagram illustrating a hardware configuration of each of the image processing apparatuses 101 and 102 illustrated in FIG. 1. This example illustrates an image processing apparatus having a scanner function, a printer function, and a facsimile function. In FIG. 3, an I/O unit 301 is connected to the information processing apparatus 100 via a communication medium such as a network (a LAN) 103. The I/O unit 301 may include a plurality of I/O units 301 to deal with a plurality of networking formats. The image processing apparatus 101 (102) transfers a device identifier (ID) and a scan image to the information processing apparatus 100 via the I/O unit 301. The image processing apparatus 101 (102) performs processing upon receipt of various types of control commands from the information processing apparatus 100. An I/F control unit 302 performs control to issue a device ID with respect to a processing system such as a scanner function (not illustrated), a printer function (also referred to as a first function, for example) or a facsimile function (also referred to as a second function, for example) that is loaded into the image processing apparatus 101 (102). The first function or the second function is allocated to any one of the functions of the image processing apparatus 101 (102). A RAM 303 is a primary storage device, and is used to store external data such as a control command acquired by the I/O 301 and an image read by a scanner engine 313. Further, the RAM 303 is used to store an image before being rasterized by a printer controller 310 and transferred to a printer engine 306.

A RAM control unit 304 performs allocation management of the RAM 303. An image data start-stop circuit 305 is a device for outputting the image, which has been loaded into the RAM control unit 304, acquired by the printer controller 310 and the scanner engine 313 as the printer engine 306 rotates. The printer engine 306 is a device for developing the image on output media such as paper. A main controller 308 performs various types of control of the printer engine 306 with an engine I/F 307. The main controller 308 is a module serving as the core of control, and performs appropriate distribution processing of a control language that is received from the information processing apparatus 100 to a scanner controller 309, the printer controller 310, and a facsimile controller 311 via the I/O unit 301. Further, the main controller 308 controls the printer engine 306 and the scanner engine 313 with the support of the controllers 309, 310, and 311 and a user interface 312. Control interfaces between the main controller 308 and the various types of controllers 309, 310, and 311 are unified so that an expansion board capable of processing a plurality of types of control commands can be loaded into one peripheral device. The function of the main controller 308 is to acquire a device ID of an expansion controller that is currently loaded from each of the controllers 309, 310, and 311 and manage the acquired device ID. The scanner controller 309 decomposes a scan control command, which has been received from the information processing apparatus 100, into an internal execution instruction that can be interpreted by the main controller 308. An image, which has been read by the scanner engine 313, is changed into a scan control command. The printer controller 310 decomposes a page description language, which has been received from the information processing apparatus 100, into an internal execution instruction including a rasterized image of a page description language that can be interpreted by the main controller 308. The rasterized image is carried to the printer engine 306, and is printed on output media such as paper. The facsimile controller 311 rasterizes a facsimile control language, which has been received from the information processing apparatus 100, into an image, and transfers the image to another facsimile device and an Internet protocol-facsimile (IP-FAX) via a public line (not illustrated) or the Internet. The user interface 312 is used as an input/output unit of an instruction issued by the user when the image processing apparatus 101 (102) directly performs various types of setting of the main controller 308, the scanner function, the printer function, and the facsimile function. The scanner engine 313 reads the image, which has been printed using an optical apparatus by an instruction from the main controller 308, converts the read image into an electric signal, and transfers the electric signal to the main controller 308.

Figure 4:
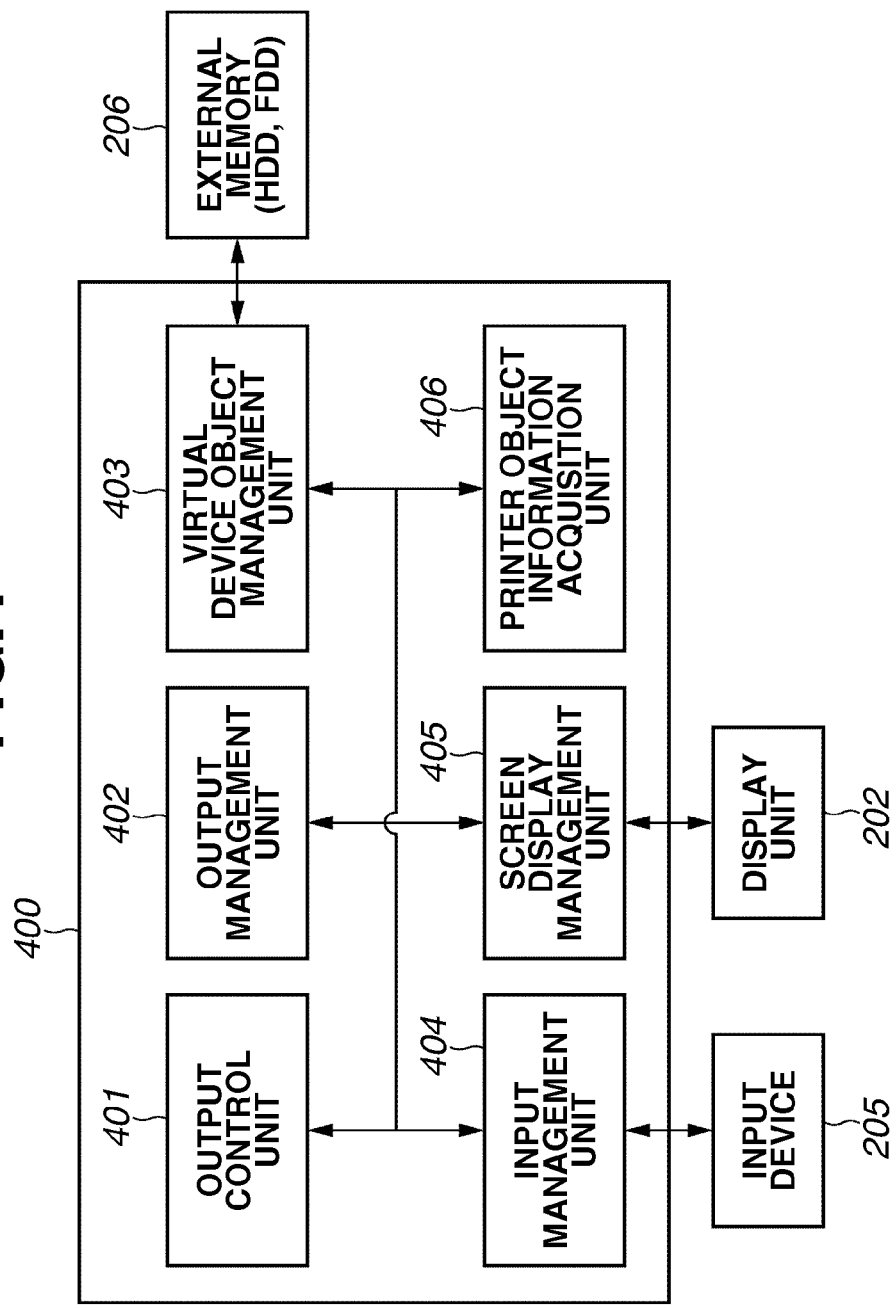
FIG. 4 illustrates a software configuration of a virtual device application.
Figure 7:
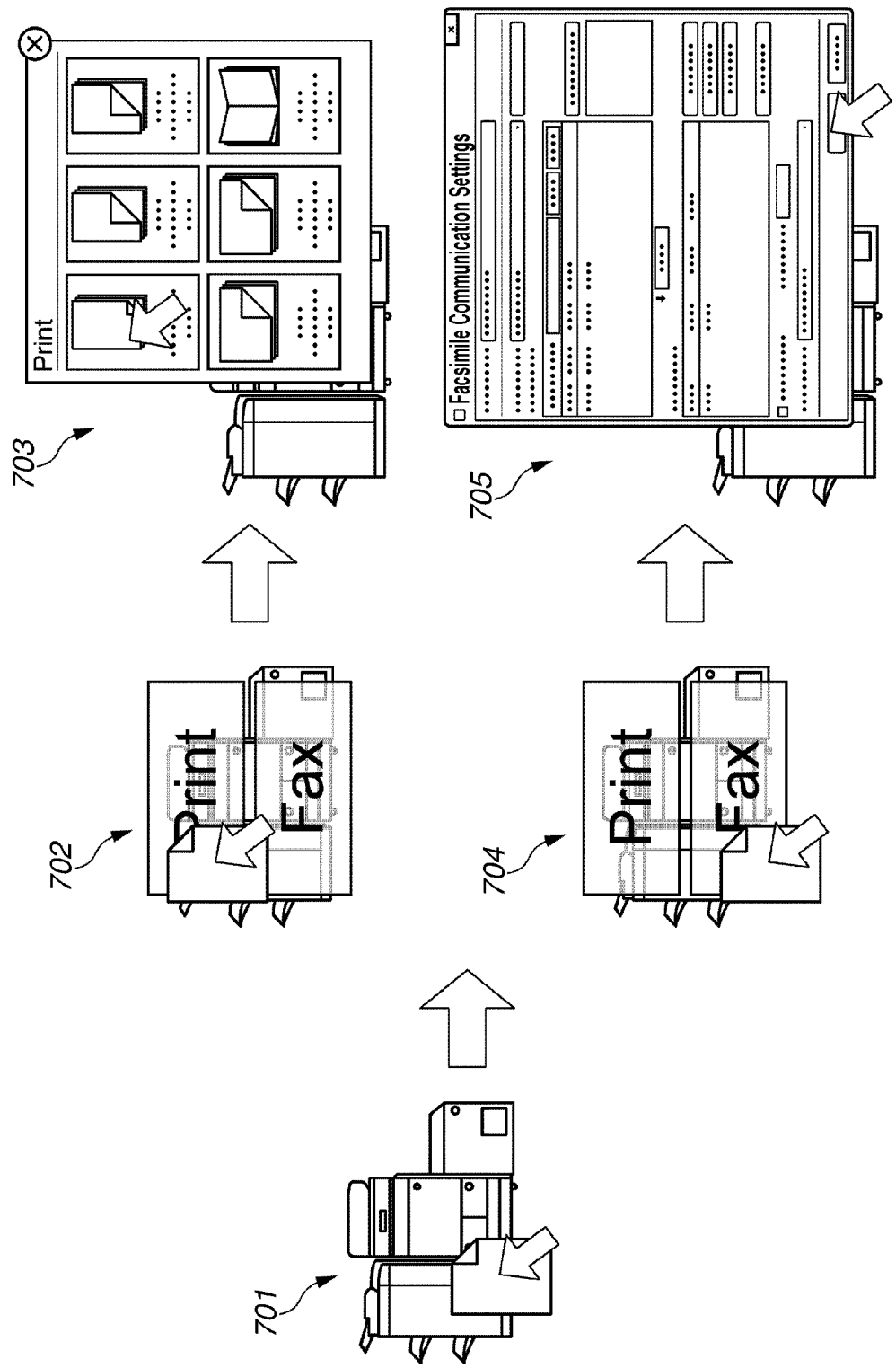
FIG. 7 illustrates an example of UI display during an output operation to a virtual device object.

FIG. 4 illustrates an example of a functional configuration of the virtual device application 400, described below, provided in the information processing apparatus 100. The virtual device application 400 is an application that is stored in the external memory 206, is loaded into the RAM 203 and the ROM. 204 when it is executed, and operates by performing calculation processing in the CPU 201. The virtual device application 400 includes an input management unit 404, a screen display management unit 405, a printer object information acquisition unit 406, a virtual device object management unit 403, an output control device 401, and an output management unit 402. The input management unit 404 detects an operation of the input device 205 by the user via a graphical user interface (GUI) of the virtual device application 400, which has been displayed by the screen display management unit 405, and acquires information about the operation performed by the user. The screen display management unit 405 controls screen display such as display of a virtual device object 503, described below, and display of output selection, as illustrated in FIG. 7 as an example, as the GUI of the virtual device application 400.

The printer object information acquisition unit 406 acquires information about a printer object 502, described below, which is managed by the OS and information about a device driver allocated to the printer object 502. The printer object information acquisition unit 406 determines whether the device driver allocated to the printer object 502 and the virtual device application 400 are capable of cooperating with each other. More specifically, an IF for controlling the function of the device driver from the virtual device application 400 may be opened. The IF is opened as a software development kit (SDK) of the device driver, and its operation for cooperation with the virtual device application 400 is ensured. The virtual device application 400 can perform control between the virtual device application 400 and the device driver via the IF. The printer object information acquisition unit 406 determines whether the device driver includes the IF, to determine whether the device driver is capable of cooperating with the virtual device application 400.

Figure 6:
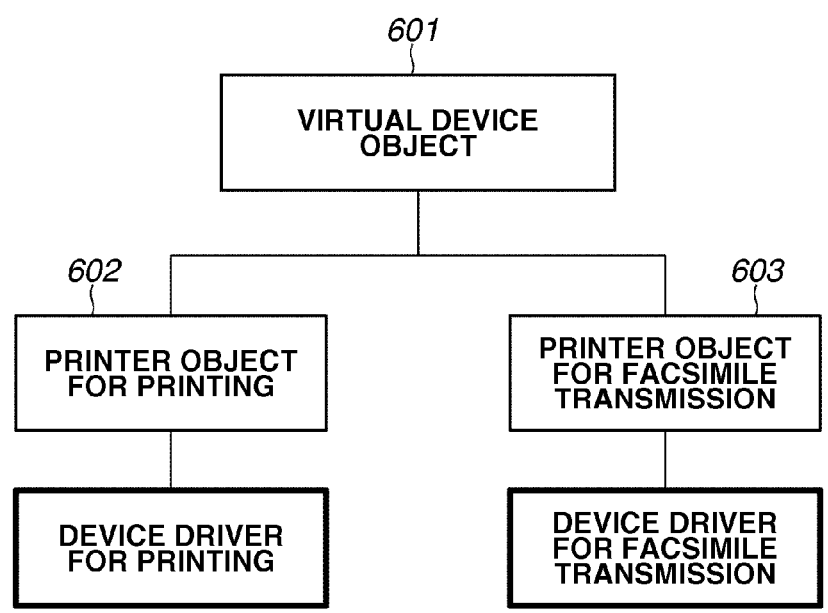
FIG. 6 illustrates a configuration of a virtual device object.

The virtual device object management unit 403 generates and manages configuration information about the virtual device object 503, as illustrated in FIG. 6. More specifically, the configuration of the virtual device object 503 is constructed based on the information about the printer object 502 that has been acquired by the printer object information acquisition unit 406. The virtual device object management unit 403 performs control to write the configuration information about the virtual device object 503 and information about setting such as function setting of the virtual device object 503 into a setting file to be stored in the external memory 206 and read the setting information from the setting file.

The output control unit 401 issues an output instruction to the image processing apparatus 101 (102). More specifically, the output control unit 401 issues, when receiving an output instruction from the user via the input management unit 404, an output instruction to the device driver allocated to the corresponding printer object 502 based on the output instruction.

A printing instruction to the printer object 502 for printing (referred to as a first device object, for example) is issued from the printer object 502 for printing to a device driver corresponding to the printer object 502. A facsimile transmission instruction to the printer object 502 for facsimile transmission (also referred to as a second device object, for example) is issued from the printer object 502 for facsimile transmission to a device driver for facsimile transmission corresponding to the printer object 502. In the present exemplary embodiment, a driver for printing (a printer driver) and a driver for facsimile transmission (a facsimile driver) are collectively referred to as a device driver.

The device driver, which has received the instruction, converts a document file (document data) designated as the output instruction into output instruction information that can be interpreted by the image processing apparatus 101 (102). The output instruction information means conversion into a data format for printing (e.g., a page-description language (PDL)) in the case of the printing instruction, and means conversion into a data format for facsimile transmission (e.g., raster data) in the case of the facsimile transmission instruction. Data to be generated by the device driver is referred to as output instruction information, a PDL, and print data. Data to be generated by the device driver may be correctively referred to as output data. The output management unit 402 communicates with the image processing apparatus 101 (102), and acquires status information about the image processing apparatus 101 (102) and status information about an execution job. A case where an output port (not illustrated) set in the printer object 502 is an application-compatible port of the virtual device application 400 will be described below. The output management unit 402 acquires status information (printable, an error, etc.) about the image processing apparatus 101 (102) and status information (during processing, completion, etc.) about the execution job (printing and facsimile transmission) via the application-compatible port. The acquired status information is transferred to the screen display management unit 405, and is displayed on a UI of the virtual device object 503 by the screen display management unit 405, which is not illustrated.

Figure 5:
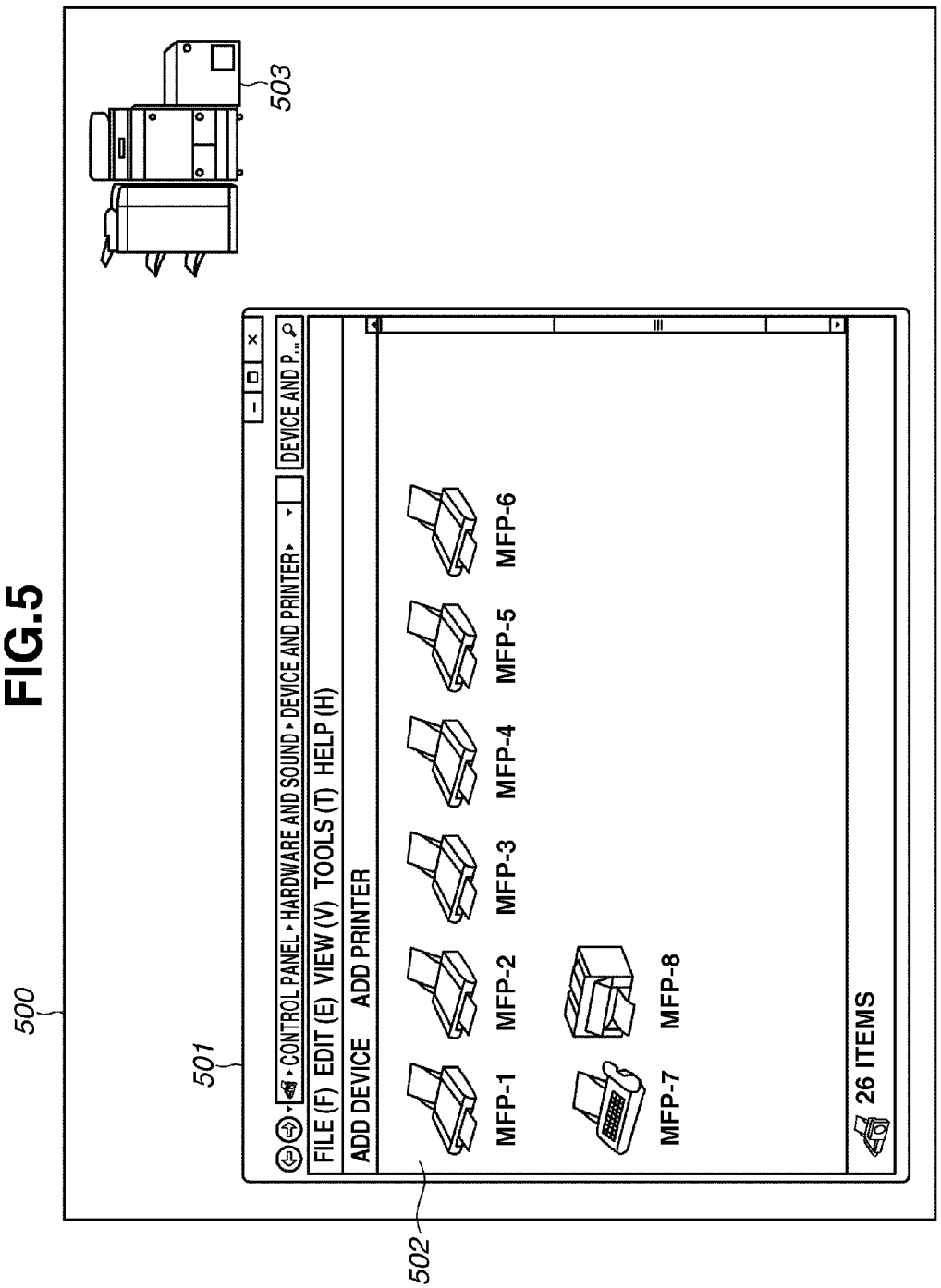
FIG. 5 illustrates an example of a management screen of printer objects in an operating system (OS) and user interface (UI) display of a virtual device application.

FIG. 5 schematically illustrates a management screen 501 of printer objects 502 in the OS and a display screen of the virtual device application 400. A desktop screen 500 is displayed by the OS. On the management screen 501 of the printer objects 502 in the OS, a list of printer objects 502 allocated all device drivers, which are installed into the OS, is displayed. When the device driver is installed into the OS, the printer object 502 corresponding to the device driver is displayed on the management screen 501 of the printer objects 502. In the present exemplary embodiment, any one of a plurality of types of device drivers may be referred to as a first device driver or a second device driver.

The printer objects 502 include printer objects 502 for purposes such as a printer object for printing 602 for sending printing instruction data to the image processing apparatus 101 (102) and a printer object for facsimile transmission 603 for sending facsimile transmission instruction data to the image processing apparatus 101 (102). The printer object 502 may be merely described as a device object. FIG. 5 schematically illustrates a display status of the virtual device object 503 to be displayed by the virtual device application 400. The virtual device object 503 is displayed on the desktop of the OS, and can easily implement desired output upon receiving an output instruction (a drop operation of a file) from the user. FIG. 6 schematically illustrates a configuration of the virtual device object 503. A virtual device object 601 (503) is allocated both the printer object for printing 602 and the printer object for facsimile transmission 603, which respectively correspond to the specified image processing apparatus 101 (102). More specifically, one virtual device object is allocated two different functions that can be physically implemented in one image processing apparatus. Further, a device driver corresponds to each printer object. In the present exemplary embodiment, the printer object for printing 602 and the printer object for facsimile transmission 603 are allocated to the virtual device object 601 according to the present exemplary embodiment. In the present exemplary embodiment, any one of the plurality of types of printer objects 502 may be referred to as a first device object or a second device object. The virtual device object 503 performs output via the printer object 502 allocated as the printer object for printing 602 when it receives the printing instruction issued by the user. On the other hand, the virtual device object 503 performs output via the printer object 502 allocated as the printer object for facsimile transmission 603 when it receives the facsimile transmission instruction issued by the user. If a plurality of image processing apparatuses 101 and 102 exists, like in the system configuration in the present exemplary embodiment, one virtual device object 503 can be generated in each of the image processing apparatuses 101 and 102.

FIG. 7 schematically illustrates a display UI during an output operation of the virtual device application 400. The virtual device application 400 receives a drag of a document file (document data) over a virtual device object 701 (503) by the user. Icons 702 and 704 corresponding to output functions are displayed on the virtual device object 701 (503). The icon "Print (a printing function)" corresponding to the printer object for printing 602 and the icon "Fax" 704 corresponding to the printer object for facsimile transmission 603 are respectively displayed as selectable functions. The user can implement desired output by dropping the document file over the icon corresponding to the output function to be executed. In the present exemplary embodiment, the virtual device application 400 recognizes that it has received an instruction to output data to the virtual device object 701 (503) when the user overlays the document file on the icon by a drag operation. The virtual device application 400 displays a UI screen 703 for designating print setting when it receives a drop operation over the icon "Print" 702. The user selects the print setting, to execute a printing instruction to the image processing apparatus 101 (102). More specifically, the virtual device application 400 issues the printing instruction to the device driver to generate print data based on the dropped document file and the print setting. The device driver generates the print data upon receiving the printing instruction so that the printing instruction to the image processing apparatus 101 (102) is implemented. The virtual device application 400 displays a destination specifying screen 705 for facsimile transmission when it receives a drop operation over the icon "FAX" 704. The virtual device application 400 issues, when the user specifies a destination to perform an execution operation, a facsimile transmission instruction to a facsimile driver to generate facsimile transmission data based on the dropped document file and the specified destination. The facsimile driver generates the facsimile transmission data upon receiving the facsimile transmission instruction so that the facsimile transmission instruction to the image processing apparatus 101 (102) is implemented. As UIs displayed on the UI screen 703 and the destination specifying screen 705, a UI to be managed by the virtual device application 400 may be displayed. Alternatively, a UI of the corresponding printer object 502 may be called.

Figure 12:
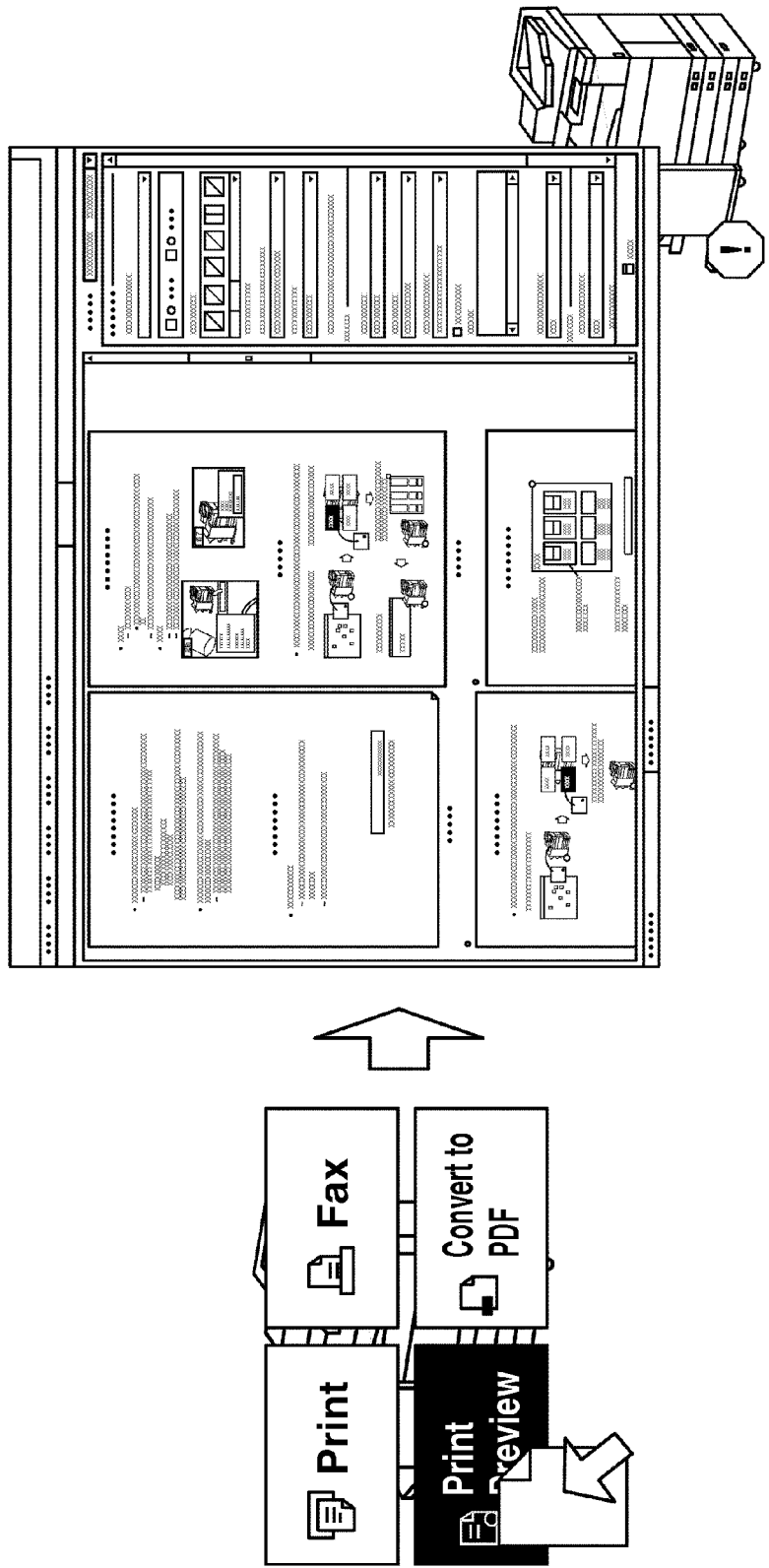
FIG. 12 illustrates an example of UI display during an output operation to a virtual device object.

An output function as illustrated in FIG. 12 in the present exemplary embodiment may be displayed as another example when the document file has been dragged over the virtual device object 701 (503). The virtual device application 400 receives a drop operation over a print preview portion (an icon portion "Print Preview") 707. In this case, the virtual device application 400 displays a UI screen 708 for displaying a print preview of the document file. The user may change print setting while confirming the print preview so that printing can be performed. The print preview based on the print setting is displayed on the UI screen 708. The printing is implemented upon receiving the print instruction via the UI screen 708. The virtual device application 400 receives a drop operation over a portable document format (PDF) conversion portion (an icon portion "Convert to PDF"). In this case, the virtual device application 400 issues an instruction to perform processing for converting the document file into a file having a PDF format.

Figure 13:
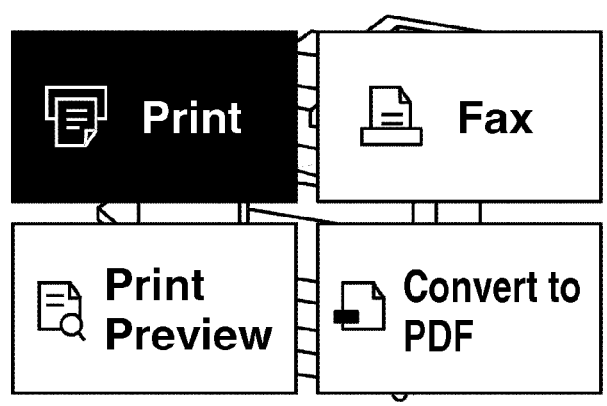
FIG. 13 illustrates an example of UI display during an output operation to a virtual device object.

The virtual device application 400 may be configured to limit its use with license authentication. If the license of the virtual device application 400 is not valid because its validity has expired, for example, functions, which can be used, are limited as illustrated in FIG. 13. The virtual device application 400 confirms whether the license is valid or invalid when it receives a drag operation of the document file over the virtual device object 701 (503) by the user. If the invalid function exists, control to indicate that the function cannot be used is performed. For example, the functions that cannot be selected (the icon portions "Print Preview" and "Convert to PDF") are grayed out as an indication that the invalid function cannot be selected, as illustrated in FIG. 13. In addition, control to delete the icon, for example, may be performed.

Figure 8:
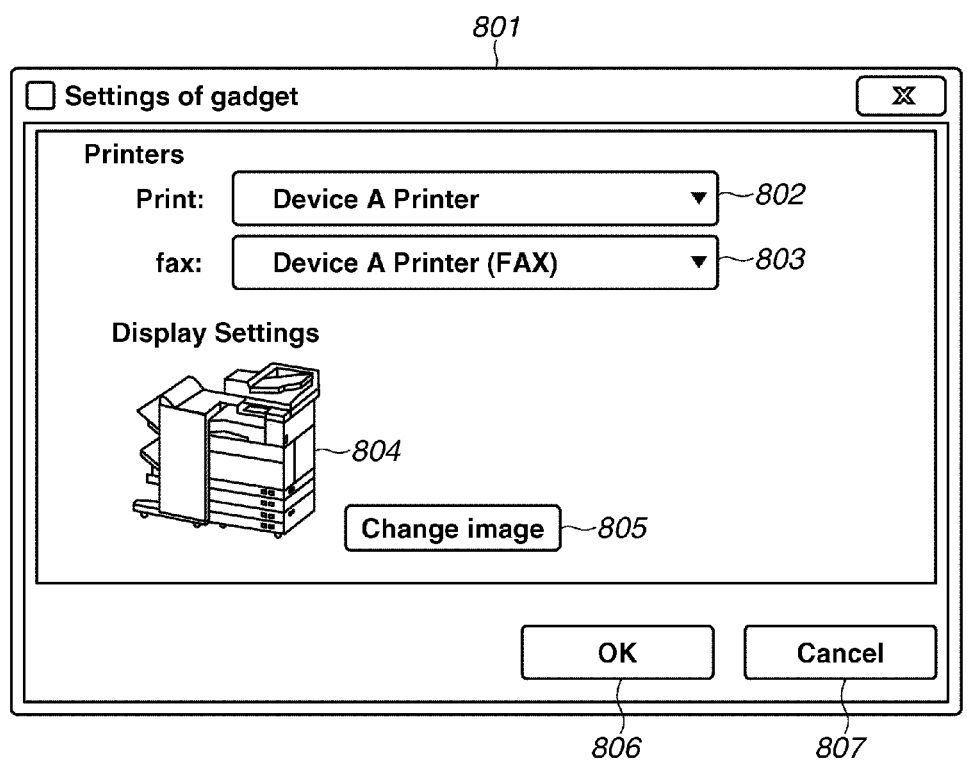
FIG. 8 illustrates an example of a setting screen of a virtual device object.

FIG. 8 schematically illustrates a setting screen for editing a setting item of the virtual device object 503. A display UI 801 edits the setting item of the virtual device object 503. When the user selects an item for editing the setting item from a context menu (not illustrated) displayed by right-clicking the virtual device object 503 via a mouse serving as one example of the input device 205, for example, the display UI 801 illustrated in FIG. 8 is displayed.

A setting item 802 receives selection of the printer object for printing 602 allocated to the virtual device object 503, and displays a list of printer objects for printing 602 out of printer objects 502 in the OS. The user can select one of the printer objects for printing 602 from the setting item 802. When the user clicks the setting item 802 using the mouse serving as one example of the input device 205, for example, the list of printer objects for printing 602 is displayed. The user can click one of the printer objects 502 from the list. The virtual device application 400 receives the selection of the printer object for printing 602 allocated to the virtual device object 503 from the user upon receiving such a click operation.

A setting item 803 receives selection of the printer object for facsimile transmission 603 allocated to the virtual device object 503, and displays a list of printer objects for facsimile transmission 603 out of the printer objects 502 in the OS. The user can select one of the printer objects for facsimile transmission 603 from the setting item 803. The setting item 803 has a similar operation method to that of the setting item 802. In the present exemplary embodiment, the printer object for facsimile transmission 603 corresponding to the printer object for printing 602 selected by the user in the setting item 802 illustrated in FIG. 8 is selected as an initial value so that an operation load on the user can be reduced. More specifically, the printer object for facsimile transmission 603 provided in the image processing apparatus 101 (102) corresponding to the selected printer object for printing 602 is selected. On the other hand, if the printer object for facsimile transmission 603 illustrated in FIG. 8 is previously selected, the printer object for printing 602 corresponding to the selected printer object for facsimile transmission 603 is selected as an initial value. A specific selection method will be described with reference to FIGS. 9 and 10. If the printer object for facsimile transmission 603 corresponding to the printer object for printing 602 selected in the setting item 802 illustrated in FIG. 8 does not exist, for example, nothing is selected in the setting item 803. In addition, the previous setting content may remain.

A preview display image 804 is displayed as the virtual device object 503. A button 805 is used to display options of the preview display image. The desired preview display image 804 is displayed by selecting a desired image file from the options displayed by pressing the button 805. An OK button 806 is used to confirm the setting content illustrated in FIG. 8, and a cancel button 807 is used to cancel the setting content. More specifically, the OK button 806 illustrated in FIG. 8 is selected so that both the printer object for printing 602 selected in the setting item 802 and the printer object for facsimile transmission 603 selected in the setting item 803 are set as the virtual device object 503.

Figure 9:
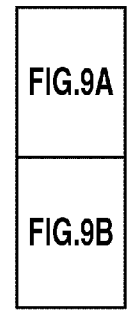
FIG. 9, which is composed of FIGS. 9A and 9B, is a flowchart illustrating the procedure for processing for selecting, when one of printer objects is selected, the other printer object.
Figure 9A:
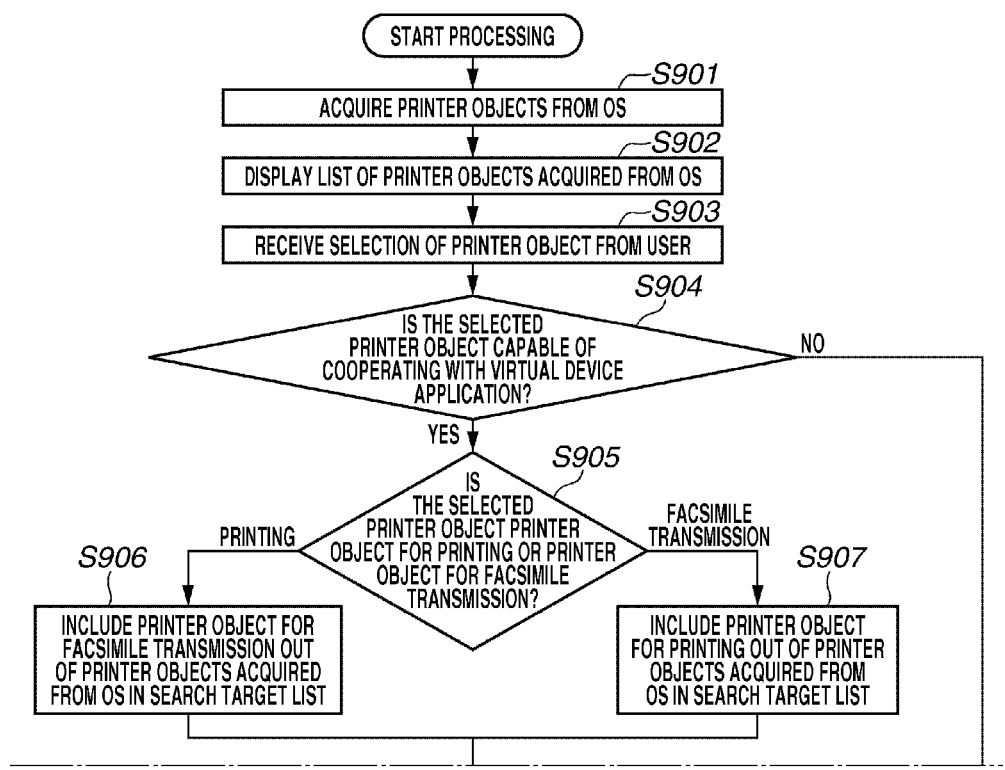
Figure 9B:
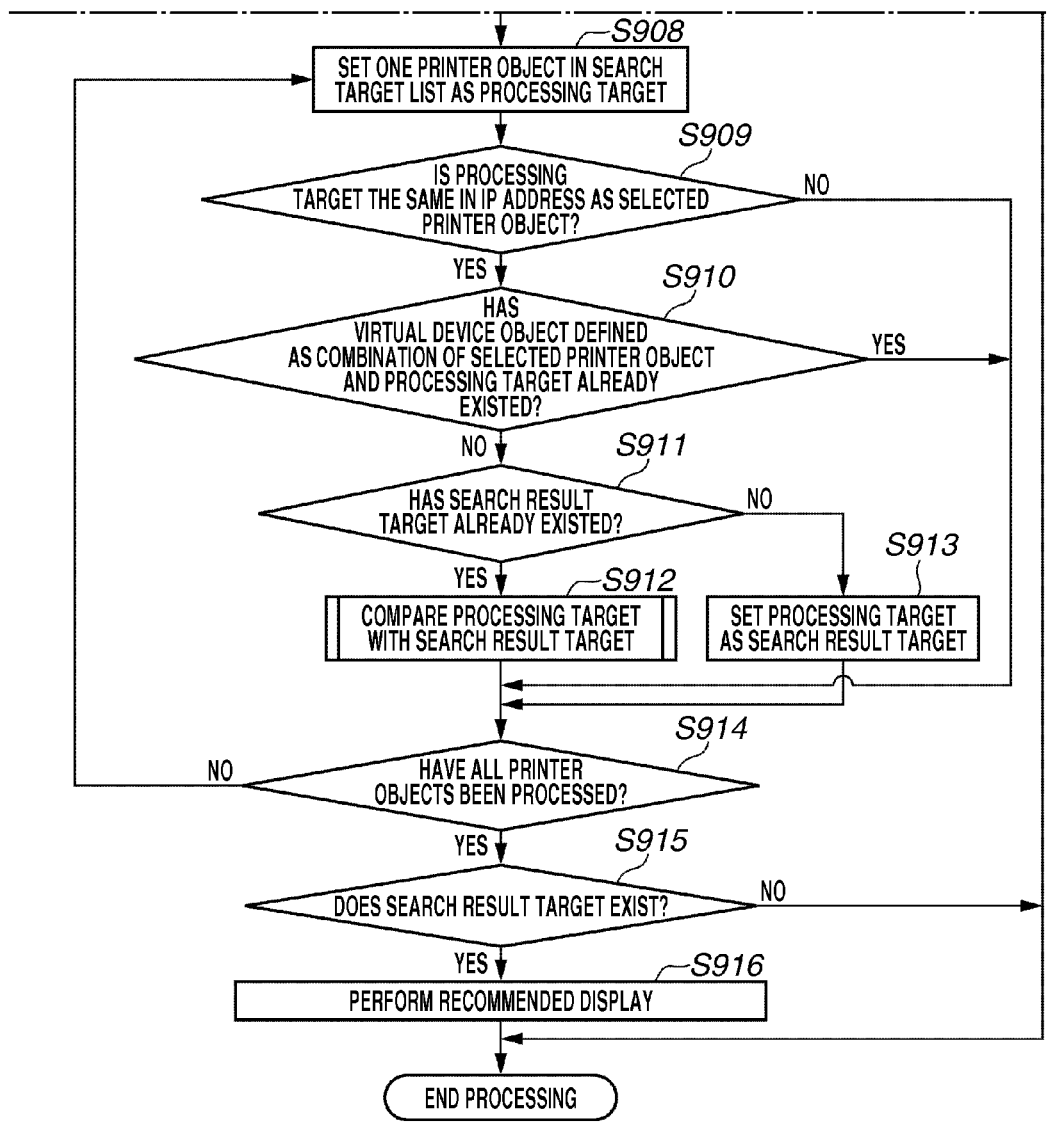

FIG. 9, which is composed of FIGS. 9A and 9B, is a flowchart implemented in the virtual device application 400 in the present exemplary embodiment, and is a flowchart particularly illustrating an example of processing for automatically selecting, when the printer object 502 corresponding to one of two different functions allocated to the virtual device object 503 has been changed, the printer object 502 corresponding to the other function. The processing illustrated in FIG. 9 is performed when the screen illustrated in FIG. 8 is displayed. Flowcharts in the present exemplary embodiment are implemented when the CPU 201 reads out a program associated with each of the flowcharts from a memory and executes the read program.

In step S901, the virtual device application 400 first requests the printer object information acquisition unit 406 to acquire the printer objects 502 from the OS. The virtual device application 400 acquires information about all the printer objects 502. In step S902, the virtual device application 400 displays a list of printer objects 502 acquired in step S901. At this time, the printer object for printing 602 is displayed in the setting item. 802, and the printer object for facsimile transmission 603 is displayed in the setting item 803.

In step S903, the virtual device application 400 receives selection of the printer object 502 from the user. More specifically, the virtual device application 400 receives selection of the printer object 502 from the setting item 802 or 803.

In step S904, the virtual device application 400 determines whether the printer object 502 selected in step S903 by the user is capable of cooperating with the virtual device application 400. The virtual device object management unit 403 specifies a printer object name of the printer object 502 selected in step S903, and instructs the printer object information acquisition unit 406 to initialize the IF in the device driver corresponding to the selected printer object 502. At this time, the printer object information acquisition unit 406 attempts initialization via the SDK of the device driver. The initialization means processing for calling the IF in the device driver via the SDK of the device driver and attempting to acquire configuration information about the device driver. The printer object information acquisition unit 406, which has received an initialization processing result from the SDK of the device driver corresponding to the printer object 502, determines whether the initialization processing has been successfully performed in step S904, and transfers a determination result to the virtual device object management unit 403. If the initialization processing has been successfully performed, the IF is successfully called so that the configuration information can be acquired. On the other hand, if the IF is unsuccessfully called because the device driver does not cooperate with the virtual device application 400, the initialization processing has been unsuccessfully performed. If the initialization processing has been successfully performed, it is determined that the printer object 502 is capable of cooperating with the virtual device application 400. If the initialization processing has been unsuccessfully performed, it is determined that the printer object 502 is incapable of cooperating with the virtual device application 400. If it is determined that the printer object 502 is capable of cooperating with the virtual device application 400 (YES in step S904), the processing proceeds to step S905. If it is determined that the printer object 502 is incapable of cooperating with the virtual device application 400 (NO in step S904), the processing ends.

In step S905, the virtual device application 400 determines whether the printer object 502 selected in step S903 by the user is the printer object for printing 602 or the printer object for facsimile transmission 603. More specifically, the determination can be performed when the printer object information acquisition unit 406 refers to information about the printer object 502 via the SDK of the device driver. if it is determined that the printer object 502 is the printer object for printing 602, the processing proceeds to step S906. If it is determined that the printer object 502 is the printer object for facsimile transmission 603, the processing proceeds to step S907. In step S906, the virtual device application 400 selects the printer object for facsimile transmission 603 corresponding to the printer object for printing 602 selected in step S903 by the user. Therefore, the virtual device application 400 includes the printer object for facsimile transmission 603 out of the printer objects 502 acquired from the OS in a search target list.

Similarly, in step S907, the virtual device application 400 selects the printer object for printing 602 corresponding to the printer object for facsimile transmission 603 selected in step S903 by the user. Therefore, the virtual device application 400 includes the printer object for printing 602 out of the printer objects 502 acquired from the OS in the search target list.

In step S908, the virtual device application 400 sets the one printer object 502 in the search target list acquired in steps S906 and S907 as a processing target. The virtual device application 400 determines whether the printer object 502 serving as a processing target is the printer object 502 suitable for use in the virtual device application 400 corresponding to the printer object 502 selected in step S903.

In step S909, the virtual device application 400 determines whether the printer object 502 serving as a processing target and the printer object 502 selected in step S903 are the same in address information (an internet protocol (IP) address of the image processing apparatus 101 (102)). The determination enables confirmation whether the printer object 502 serving as a processing target and the printer object 502 selected in step S903 are the printer objects 502 for the same image processing apparatus 101 (102). If it can be determined whether each of the printer objects 502 corresponds to the same image processing apparatus 101 (102), a determination method is not limited to this. If the printer objects 502 represent the same image processing apparatus 101 (102) (YES in step S909), the processing proceeds to step S910. Otherwise (NO in step S909), the processing proceeds to step S914.

In step S910, the virtual device application 400 determines whether the virtual device object 503 defined as a combination of the printer object 502 selected in step S903 and the printer object 502 serving as a processing target has already existed. If the same virtual device object as the virtual device object 503 defined as the combination has already been generated, this processing is performed to avoid recommendation of the combination because the generation of the virtual device object 503 in the same setting is not useful. If the virtual device object 503 defined as the combination has already existed (YES in step S910), the processing proceeds to step S914. Otherwise (NO in step S910), the processing proceeds to step S911. Step S910 is implemented by determining a printer name of the printer object 502 allocated to the virtual device object 503 that has already existed as a specific determination method.

In step S911, the virtual device application 400 determines whether a search result target to be recommended as the printer object 502 serving as the other function, which corresponds to the printer object 502 selected in step S903, has already existed. If the search result target has already existed (YES in step S911), the processing proceeds to step S912. Otherwise (NO in step S911), the processing proceeds to step S913.

In step S912, the virtual device application 400 compares the printer object 502 serving as a processing target with the printer object 502 that has already been a search result target. The virtual device application 400 determines the printer object 502 more suitable for use in the virtual device application 400. Specific processing will be described below in an explanation illustrated in FIG. 10.

In step S913, the virtual device application 400 sets, when the printer object 502 serving as a search result target has not yet existed, the printer object 502 serving as a processing target as a search result target. This indicates that the printer object 502 is more suitable for use in the virtual device application 400 out of the printer objects 502 currently searched for.

In step S914, the virtual device application 400 determines whether all the printer objects 502 in the search target list, which has been acquired in step S906 or S907, have been processed. In the present exemplary embodiment, the more suitable printer object 502 is searched for out of all the printer objects 502. However, when the printer object 502 serving as a search result target has been first found in step S913, the printer object 502 may be recommended. If all the printer objects 502 in the search target list have been processed (YES in step S914), the processed proceeds to step S915. Otherwise (NO in step S914), the processing proceeds to step S908.

In step S915, the virtual device application 400 determines whether the printer object 502 serving as a search result target exists. If the printer object 502 serving as a search result target exists (YES in step S915), the printer object 502 corresponds to the printer object 502 selected in step S903, and is more suitable for use in the virtual device application 400. The processing illustrated in FIG. 9 proceeds to step S916. Otherwise (NO in step S915), the processing ends.

In step S916, the virtual device application 400 performs recommended display. The recommended display means indicating that the printer object 502 more suitable for use in the virtual device application 400 corresponding to the printer object 502 selected in step S903 exists. If the printer object 502 selected in step S903 is the printer object for printing 602, for example, the printer object 502 serving as a search result target is automatically brought into a selected state in the setting item 803. More specifically, the printer object 502 serving as a search result target is displayed as an initial value of the setting item 803.

If there exists a plurality of candidates for the printer object 502 serving as a search result target in steps S911 to S913, the more suitable printer object 502 is selected. However, the more suitable printer object 502 may be automatically brought into a selected state, and the other printer objects 502 serving as a search result target may also be brought into an easily selectable state. When PULL-DOWN is clicked in one of the setting item 802 and the setting item 803, for example, a list of printer objects 502 is displayed. The same printer objects 502 corresponding to the same image processing apparatus 101 (102) as the printer object 502 selected in the other setting item may be arranged at the top of the list, or may be colored or underlined. By such processing, the printer objects 502 representing the same image processing apparatus 101 (102) may be brought into an easily selectable state by the user.

When the printer object 502 in one of the setting items illustrated in FIG. 8 is selected via the processing illustrated in FIG. 9, the printer object 502 in the other setting item is automatically brought into a selected state. If the content is acceptable, the user selects the OK button 806 illustrated in FIG. 8. After the printer object 502 recommended by the virtual device application 400 is automatically selected via the processing illustrated in FIG. 9, the user may change the printer object 502 to still another printer object.

Figure 10:
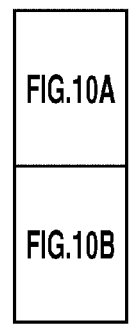
FIG. 10, which is composed of FIGS. 10A and 10B, is a flowchart illustrating the procedure for processing in a case where a plurality of selection targets exists in selecting, when one of printer objects is selected, the other printer object.
Figure 10A:
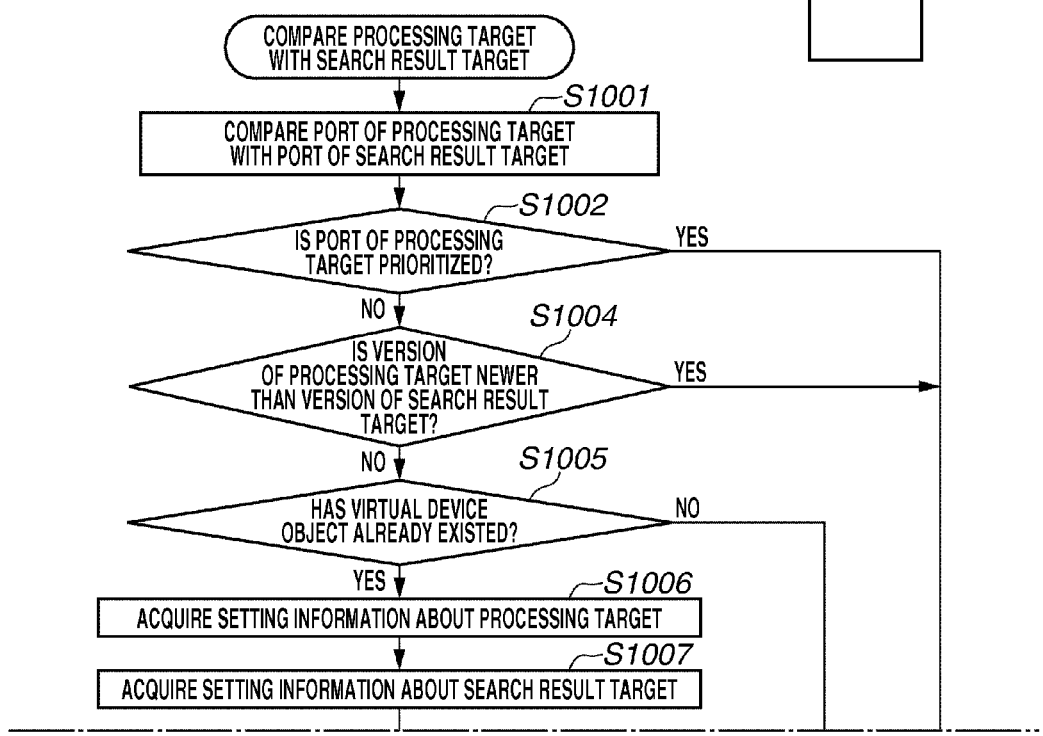
Figure 10B:
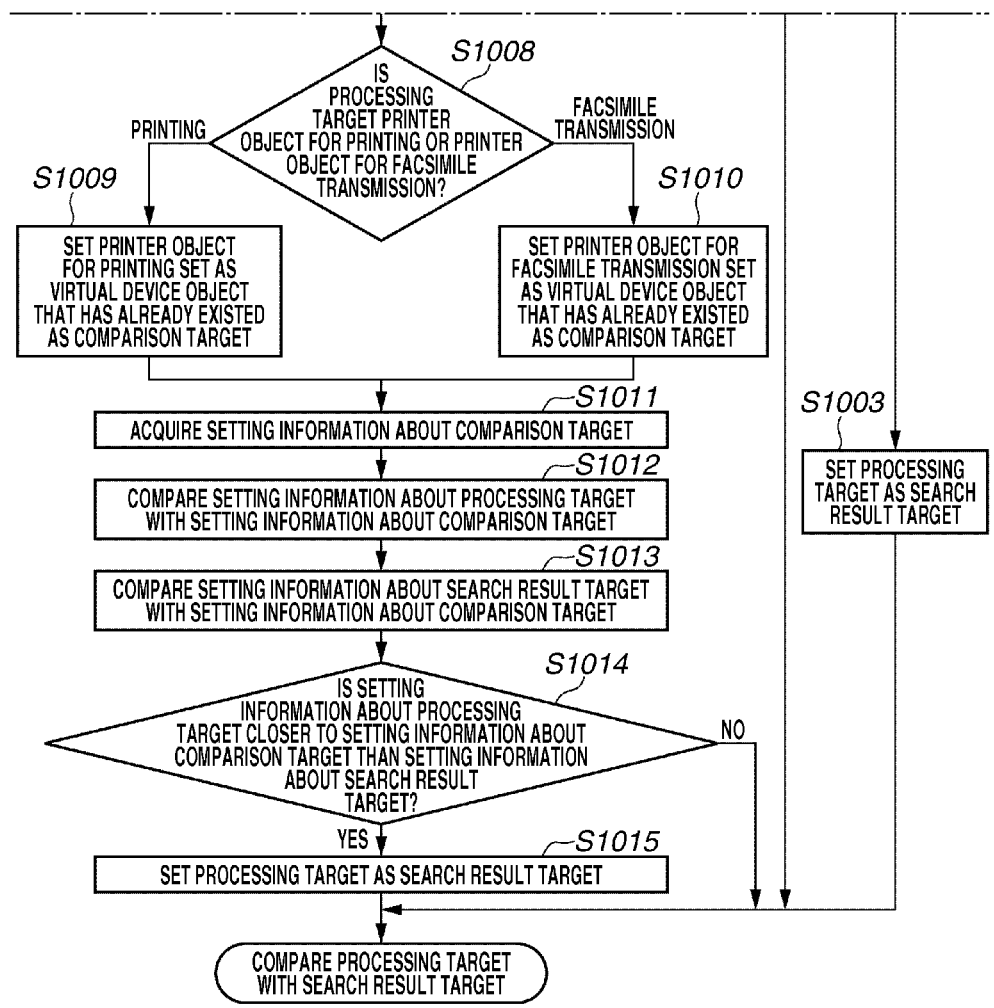

FIG. 10, which is composed of FIGS. 10A and 10B, is a flowchart for illustrating the processing in step S912 in detail. More specifically, FIG. 10 illustrates a flow for determining, when there exists a plurality of printer objects 502 of different types representing the same image processing apparatus 101 (102) as the printer object 502 selected in step S903, the appropriate printer object 502.

In step S1001, the virtual device application 400 compares output port information about the printer object 502 serving as a processing target with output port information about the printer object 502 serving as a search result target. In step S1002, the virtual device application 400 determines whether an output port of the printer object 502 serving as a processing target is to be prioritized. More specifically, the OS manages configuration information about an output port for the type of the output port. In a Standard transmission control protocol/ Internet protocol (TCP/IP) port serving as a general output port, for example, output ports that are considered as its type are collected as a Standard TCP/IP port group. The type of the output port, which can be dealt with by the virtual device application 400, out of the output ports is previously specified. Processing in step S1002 is implemented depending on whether the output port of the printer object 502 serving as a processing target corresponds to the specified type. If one of the printer object 502 serving as a processing target and the printer object 502 serving as a search result target is an output port that can be dealt with by the virtual device application 400, the printer object 502 set as the output port that can be dealt with by the virtual device application 400 is prioritized. The output port that can be dealt with is also referred to as an application-compatible port or a predetermined output port. The application-compatible port is a port capable of acquiring a status of the image processing apparatus 101 (102) and a processing status of print data in the image processing apparatus 101 (102). More specifically, the virtual device object 503 can acquire a processing status indicating that prints based on the print data are actually discharged from a printing apparatus via the application-compatible port. The virtual device object 503 can also acquire a notification that facsimile data has been received from an output apparatus via the application-compatible port. More specifically, the virtual device application 400 can acquire information via the application-compatible port to acquire more information (specific information) than that via the other port from the output apparatus. On the other hand, in the Standard TCP/IP port, the processing status of the prints based on the print data cannot be acquired. Therefore, the printer object 502 set as the application-compatible port is prioritized. This processing enables the virtual device application 400 to be used more effectively when a desirable output port in using the virtual device application 400 is determined, for example. The user need not perform selection for the use of the virtual device application 400, resulting in improved user's operability.

If the printer object 502 serving as a processing target is the application-compatible port, and the printer object 502 serving as a search result target is not the application-compatible port, the printer object 502 serving as a processing target is prioritized. If it is determined that the printer object 502 serving as a processing target is prioritized (YES in step S1002), the processing proceeds to step S1003. Otherwise (NO in step S1002), the processing proceeds to step S1004.

In step S1003, the virtual device application 400 sets the printer object 502 serving as a processing target as the printer object 502 serving as a search result target. The printer object 502, which has been determined to be prioritized in step S1002, is the printer object 502 more suitable for use in the virtual device application 400 corresponding to the printer object 502 selected in step S903. Therefore, the printer object 502 is set as a search result target.

In step S1004, the virtual device application 400 determines whether the version of a device driver corresponding to the printer object 502 serving as a processing target is newer than the version of a device driver corresponding to the printer object 502 serving as a search result target. If the version of the device driver corresponding to the printer object 502 serving as a processing target is newer than the version of the device driver corresponding to the printer object 502 serving as a search result target (YES in step S1004), the processing proceeds to step S1003. Otherwise (NO in step S1004), the processing proceeds to step S1005.

In step S1005, the virtual device application 400 determines whether the virtual device object 503 has already existed. The virtual device object 503 can include a plurality of virtual device objects 503 to be generated within the virtual device application 400. The virtual device application 400 determines whether the virtual device object management unit 403 has already generated the virtual device object 503. If the virtual device object 503 has already existed (YES in step S1005), the processing proceeds to step S1006. If the virtual device object 503 has not yet existed (NO in step S1005), the processing ends while the printer object 502, which has already been set as a search result target, continues to be the search result target.

In step S1006, the virtual device application 400 acquires setting information about the printer object 502 serving as a processing target from the printer object information acquisition unit 406. The printer object 502 has setting information for each of the printer objects 502, and stores basic print setting information set during default printing and information such as the type of printer controller in the image processing apparatus 101 (102), for example. The setting information of each of the printer objects 502 is acquired.

In step S1007, the virtual device application 400 acquires setting information about the printer object 502 serving as a search result target from the printer object information acquisition unit 406. The processing in step S1007 is similar to the processing in step S1006 except that an acquisition target is the printer object 502 serving as a search result target.

In step S1008, the virtual device application 400 determines whether the printer object 502 serving as a processing target is the printer object for printing 602 or the printer object for facsimile transmission 603. A method for determining the type of the printer object 502 is similar to that in step S905. If it is determined that the printer object 502 serving as a processing target is the printer object for printing 602, the processing proceeds to step S1009. Otherwise, the processing proceeds to step S1010.

In step S1009, the virtual device application 400 sets the printer object for printing 602, which has been set out of the virtual device objects 503 that have already existed, as a comparison target, and the processing proceeds to step S1011.

In step S1010, the virtual device application 400 sets the printer object for facsimile transmission 603, which has been set out of the virtual device objects 503 that have already existed, as a comparison target, and the processing proceeds to step S1011.

In step S1011, the virtual device application 400 acquires setting information about the printer object 502 serving as a comparison target, which has been specified in step S1009 or S1010, from the printer object information acquisition unit 406. The processing in step S1011 is similar to the processing in step S1006 except that an acquisition target is the printer object 502 serving as a comparison target.

In step S1012, the virtual device application 400 compares the setting information about the printer object 502 serving as a processing target with the setting information about the printer object 502 serving as a comparison target. More specifically, values that have been respectively set for the setting items are compared. For example, the sizes of pages for basic print setting are compared to determine whether they are the same setting value, or printer controllers are compared to determine whether they are the same controller.

In step S1013, the virtual device application 400 compares the setting information about the printer object 502 serving as a search result target with the setting information about the printer object 502 serving as a comparison target. A specific content is similar to that in step S1012.

In step S1014, the virtual device application 400 determines whether the setting information about the printer object 502 serving as a processing target is closer to the setting information about the printer object 502 serving as a comparison target than the setting information about the printer object 502 serving as a search result target. The determination may be performed depending on whether the number of items, which match each other, out of all items of the setting information about the printer object 502 is larger or whether the number of items, which match each other, out of only items of the basic print setting information is larger. Alternatively, the determination may be performed by respectively adding weights to the items depending on the type of each of the items and comparing results each obtained by adding the number of weights added to the items that match each other. While the printer object 502 closer to setting information about the virtual device object 503, which has already existed, is recommended in the present exemplary embodiment, an implementation method for recommending the printer object 502, which is not close to the setting information, is not an exception of the present exemplary embodiment. If the printer object 502 allocated to the virtual device object 503 that has already existed and the printer object 502 serving as a processing target represent the same image processing apparatus 101 (102), it is appropriate to desire to newly set virtual device objects 503 in different settings. In this case, if the number of items, which match each other, of the setting information about either one of the printer objects 502 is smaller, an implementation method using the printer object 502 as a search result target is also a range of the present exemplary embodiment. If it is determined that the setting information about the printer object 502 serving as a processing target is closer to the setting information about the printer object 502 serving as a comparison target than the setting information about the printer object 502 serving as a search result target (YES in step S1014), the processing proceeds to step S1015. Otherwise (NO in step S1014), the processing ends.

In step S1015, the virtual device application 400 sets the printer object 502 serving as a processing target as the printer object 502 serving as a search result target. In the flowchart, the printer object 502, which is closer in a set content to the printer object 502 allocated to the virtual device object 503 that has already existed, is recommended. If a printer attribute, which is generally used by the OS, is set to either one of the printer object 502 serving as a processing target and the printer object 502 serving as a search result target, the virtual device application 400 selects the printer object 502 to which the printer attribute is set.

The foregoing processing enables a load put when the user sets the printer object 502 allocated to the virtual device object 503 to be reduced.

Figure 11B:
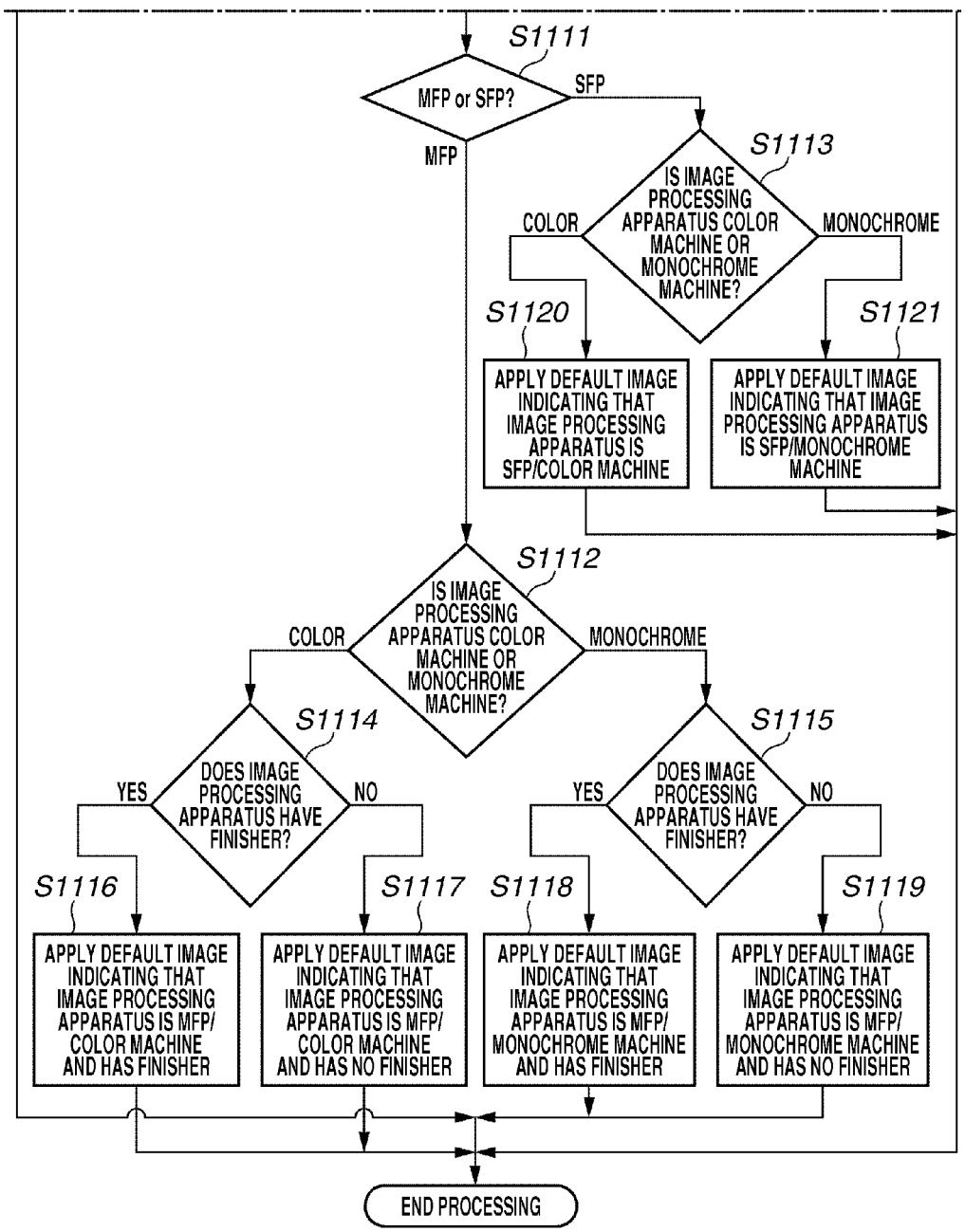
FIG. 11, which is composed of FIGS. 11A and 11B, is a flowchart illustrating the procedure for processing for determining an image of a virtual device object.

FIG. 11, which is composed of FIGS. 11A and 11B, is a flowchart for automatically selecting a device image corresponding to the virtual device object 503 including a combination of the printer objects 502 selected in FIGS. 9 and 10. More specifically, the virtual device application 400 automatically determines the preview display image 804 of the virtual device object 503 according to selection contents of the setting items 802 and 803 illustrated in FIG. 8.

In step S1101, the virtual device application 400 determines whether the image processing apparatus 101 (102) represented by the printer object for printing 602 in the setting item 802 and the image processing apparatus 101 (102) represented by the printer object for facsimile transmission 603 in the setting item 803 differ from each other. A method for the determination in step S1101 is similar to that in step S909. If the image processing apparatus 101 (102) represented by the printer object for printing 602 in the setting item 802 and the image processing apparatus 101 (102) represented by the printer object for facsimile transmission 603 in the setting item 803 differ from each other (YES in step S1101), the processing proceeds to step S1102. If the image processing apparatuses 101 (102) are the same (NO in step S1101), the processing proceeds to step S1103.

In step S1102, the virtual device application 400 acquires information about the image processing apparatus 101 (102) represented by the printer object for printing 602 allocated to the virtual device object 503. Basically, a case where the respective image processing apparatuses 101 (102) represented by the printer object for printing 602 and the printer object for facsimile transmission 603 are the same by the flowcharts illustrated in FIGS. 9 and 10 becomes a main flow. However, the printer object 502 of one of the types may only exist. Alternatively, the user may allocate the printer objects 502 respectively representing the image processing apparatuses 101 (102), which explicitly differ from each other, to the virtual device object 503. To deal with such a case, if the image processing apparatuses 101 (102) respectively represented by the set printer object for printing 602 and the set printer object for facsimile transmission 603 differ from each other, device configuration information about the printer object for printing 602 is prioritized when acquired. After this processing, the processing proceeds to step S1103.

In step S1103, the virtual device application 400 refers to an IP address of the printer object for printing 602 set as the virtual device object 503. In step S1104, the virtual device application 400 acquires a product name from the image processing apparatus 101 (102) based on the IP address. In step S1105, the virtual device application 400 determines whether the product name has been able to be normally acquired in step S1104. If the product name has been able to be normally acquired (YES in step S1105), the processing proceeds to step S1106. If the product name has been unable to be normally acquired (NO in step S1105), the processing proceeds to step S1108.

In step S1106, the virtual device application 400 determines whether an image file of an actual device corresponding to the product name is to be stored. The virtual device application 400 previously prepares a device image list used for the virtual device object 503. In step S1106, the virtual device application 400 determines whether the device image list includes the image file of the actual device corresponding to the product name. If the image file corresponding to the product name exists (YES in step S1106), the processing proceeds to step S1107. If the image file corresponding to the product name does not exist (NO in step S1106), the processing proceeds to step S1108.

In step S1107, the virtual device application 400 applies the image file of the actual device as a display image of the virtual device object 503.

In step S1108, the virtual device application 400 determines whether acquisition of device configuration information has failed. A method for the determination in step S1108 is similar to that in step S904. If the acquisition of the device configuration information has failed (YES in step S1108), the processing proceeds to step S1109. Otherwise (NO in step S1108), the processing proceeds to step S1110. In step S1109, the virtual device application 400 acquires the device configuration information, and the processing proceeds to step S1111. In step S1110, the virtual device application 400 applies a default image file prepared for the failure of the acquisition of the device configuration information as a display image of the virtual device object 503.

In step S1111, the virtual device application 400 determines whether the image processing apparatus 101 (102) is a multifunction printer (MFP) or a single function printer (SFP) from the acquired device configuration information. If the image processing apparatus 101 (102) is the MFP, the processing proceeds to step S1112. Otherwise, the processing proceeds to step S1113.

In step S1112, the virtual device application 400 determines whether the image processing apparatus 101 (102) is a color machine or a monochrome machine from the device configuration information about the image processing apparatus 101 (102). If the image processing apparatus 101 (102) is the color machine, the processing proceeds to step S1114. If the image processing apparatus 101 (102) is the monochrome machine, the processing proceeds to step S1115. Step S1113 is similar to step S1112. If the image processing apparatus 101 (102) is a color machine, the processing proceeds to step S1120. Otherwise, the processing proceeds to step S1121.

In step S1114, the virtual device application 400 determines whether the image processing apparatus 101 (102) has a finisher from the device configuration information. If the image processing apparatus 101 (102) has a finisher, the processing proceeds to step S1116. Otherwise (NO in step S1114), the processing proceeds to step S1117. Step S1115 is similar to step S1114. If the image processing apparatus 101 (102) has a finisher (YES in step S1115), the processing proceeds to step S1118. Otherwise (NO in step S1115), the processing proceeds to step S1119.

In steps S1116 to S1121, the virtual device application 400 applies an image file suitable for the device configuration information as the display image of the virtual device object 503 based on the determination processing in steps S1112 to S1115. For example, by the determination in steps S1112 to S1115, the virtual device application 400 determines whether the image processing apparatus 101 (102) represented by the virtual device object 503 is an MFP and a color machine and has a finisher. By this determination, the virtual device application 400 applies an image indicating that the image processing apparatus 101 (102) is an MFP and a color machine and has a finisher as the display image of the virtual device object 503.

Thus, the user can reduce a load put when the display image of the virtual device object 503 is set.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-038884 filed Feb. 24, 2012, which is hereby incorporated by reference herein in its entirety.

What is claimed is:

1. An information processing apparatus comprising:
a first selection unit configured to receive selection of a first device object having a first function of an output apparatus via a setting screen;
a second selection unit configured to automatically select a second device object having a second function of the output apparatus, which corresponds to the first device object selected by the first selection unit;
a setting unit configured to set both the first device object selected by the first selection unit and the second device object selected by the second selection unit to a virtual device object; and
an output unit configured to output, when an instruction to output data is received for the first function of the virtual device object to which both the first device object and the second device object have been set by the setting unit, an instruction to cause the output apparatus to execute the first function, and to output, when an instruction to output data is received for the second function of the virtual device object to which both the first device object and the second device object have been set, an instruction to cause the output apparatus to execute the second function,
wherein the first function differs from the second function.

2. The image processing apparatus according to claim 1,
wherein the output instruction to cause the output apparatus to execute the first function is notified to a first device driver corresponding to the first device object, and output data generated by the first device driver is sent to the output apparatus, and
wherein the output instruction to cause the output apparatus to execute the second function is notified to a second device driver corresponding to the second device object, and output data generated by the second device driver is sent to the output apparatus.

3. The information processing apparatus according to claim 1, wherein the first function is a printing function, and the second function is a facsimile function.

4. An information processing apparatus comprising:
a first selection unit configured to receive selection of a first device object having a first function of an output apparatus via a setting screen;
a second selection unit configured to automatically select a second device object having a second function of the output apparatus, which corresponds to the first device object selected by the first selection unit; and
a setting unit configured to set both the first device object selected by the first selection unit and the second device object selected by the second selection unit to a virtual device object,
wherein the first function differs from the second function, and
wherein the second selection unit automatically selects, when a plurality of device objects corresponding to the second function of the output apparatus, which is the same as the first device object selected by the first selection unit, exists, the device object to which a predetermined output port has been set as the second device object from among the plurality of device objects.

5. An information processing apparatus comprising:
a first selection unit configured to receive selection of a first device object having a first function of an output apparatus via a setting screen;
a second selection unit configured to automatically select a second device object having a second function of the output apparatus, which corresponds to the first device object selected by the first selection unit; and
a setting unit configured to set both the first device object selected by the first selection unit and the second device object selected by the second selection unit to a virtual device object,
wherein the first function differs from the second function, and
wherein the second selection unit automatically selects, when a plurality of device objects corresponding to the second function of the output apparatus, which is the same as the first device object selected by the first selection unit, exists, the device object to which an attribute indicating that the output apparatus is generally used has been set as the second device object from among the plurality of device objects.

6. A control method for an information processing apparatus, the control method comprising:
receiving selection of a first device object having a first function of an output apparatus via a setting screen;
automatically selecting a second device object having a second function of the output apparatus, which corresponds to the selected first device object;
setting both the selected first device object and the selected second device object to a virtual device object; and
outputting, when an instruction to output data is received for the first function of the virtual device object to which both the first device object and the second device object have been set, an instruction to cause the output apparatus to execute the first function, and outputting, when an instruction to output data is received for the second function of the virtual device object to which both the first device object and the second device object have been set, an instruction to cause the output apparatus to execute the second function,
wherein the first function differs from the second function.

7. The control method according to claim 6,
wherein the output instruction to cause the output apparatus to execute the first function is notified to a first device driver corresponding to the first device object, and output data generated by the first device driver is sent to the output apparatus, and
wherein the output instruction to cause the output apparatus to execute the second function is notified to a second device driver corresponding to the second device object, and output data generated by the second device driver is sent to the output apparatus.

8. The control method according to claim 6, wherein the first function is a printing function, and the second function is a facsimile function.

9. A control method for an information processing apparatus, the control method comprising:
receiving selection of a first device object having a first function of an output apparatus via a setting screen;
automatically selecting a second device object having a second function of the output apparatus, which corresponds to the selected first device object;
setting both the selected first device object and the selected second device object to a virtual device object; and
outputting, when an instruction to output data is received for the first function of the virtual device object to which both the first device object and the second device object have been set, an instruction to cause the output apparatus to execute the first function, and outputting, when an instruction to output data is received for the second function of the virtual device object to which both the first device object and the second device object have been set, an instruction to cause the output apparatus to execute the second function, wherein the first function differs from the second function, and wherein the selecting includes automatically selecting, when a plurality of device objects corresponding to the second function of the output apparatus, which is the same as the selected first device object, exists, the device object to which a predetermined output port has been set as the second device object from among the plurality of device objects.

10. A control method for an information processing apparatus, the control method comprising:

receiving selection of a first device object having a first function of an output apparatus via a setting screen;

automatically selecting a second device object having a second function of the output apparatus, which corresponds to the selected first device object;

setting both the selected first device object and the selected second device object to a virtual device object; and outputting, when an instruction to output data is received for the first function of the virtual device object to which both the first device object and the second device object have been set, an instruction to cause the output apparatus to execute the first function, and outputting, when an instruction to output data is received for the second function of the virtual device object to which both the first device object and the second device object have been set, an instruction to cause the output apparatus to execute the second function, wherein the first function differs from the second function, and wherein the selecting includes automatically selecting, when a plurality of device objects corresponding to the second function of the output apparatus, which is the same as the selected first device object, exists, the device object to which an attribute indicating that the output apparatus is generally used has been set as the second device object from among the plurality of device objects.

11. A non-transitory computer-readable storage medium storing a program that causes an information processing apparatus to perform a control method, the control method comprising:

receiving selection of a first device object having a first function of an output apparatus via a setting screen;

automatically selecting a second device object having a second function of the output apparatus, which corresponds to the selected first device object;

setting both the selected first device object and the selected second device object to a virtual device object; and outputting, when an instruction to output data is received for the first function of the virtual device object to which both the first device object and the second device object have been set, an instruction to cause the output apparatus to execute the first function, and outputting, when an instruction to output data is received for the second function of the virtual device object to which both the first device object and the second device object have been set, an instruction to cause the output apparatus to execute the second function, wherein the first function differs from the second function.

12. The non-transitory computer-readable storage medium according to claim 11, wherein the output instruction to cause the output apparatus to execute the first function is notified to a first device driver corresponding to the first device object, and output data generated by the first device driver is sent to the output apparatus, and wherein the output instruction to cause the output apparatus to execute the second function is notified to a second device driver corresponding to the second device object, and output data generated by the second device driver is sent to the output apparatus.

13. The non-transitory computer-readable storage medium according to claim 11, wherein the first function is a printing function, and the second function is a facsimile function.

14. A non-transitory computer-readable storage medium storing a program that causes an information processing apparatus to perform a control method, the control method comprising:

receiving selection of a first device object having a first function of an output apparatus via a setting screen;

automatically selecting a second device object having a second function of the output apparatus, which corresponds to the selected first device object;

setting both the selected first device object and the selected second device object to a virtual device object; and outputting, when an instruction to output data is received for the first function of the virtual device object to which both the first device object and the second device object have been set, an instruction to cause the output apparatus to execute the first function, and outputting, when an instruction to output data is received for the second function of the virtual device object to which both the first device object and the second device object have been set, an instruction to cause the output apparatus to execute the second function, wherein the first function differs from the second function, and wherein the selecting includes automatically selecting, when a plurality of device objects corresponding to the second function of the output apparatus, which is the same as the selected first device object, exists, the device object to which a predetermined output port has been set as the second device object from among the plurality of device objects.

15. A non-transitory computer-readable storage medium storing a program that causes an information processing apparatus to perform a control method, the control method comprising:

receiving selection of a first device object having a first function of an output apparatus via a setting screen;

automatically selecting a second device object having a second function of the output apparatus, which corresponds to the selected first device object;

setting both the selected first device object and the selected second device object to a virtual device object; and outputting, when an instruction to output data is received for the first function of the virtual device object to which both the first device object and the second device object have been set, an instruction to cause the output apparatus to execute the first function, and outputting, when an instruction to output data is received for the second function of the virtual device object to which both the first device object and the second device object have been set, an instruction to cause the output apparatus to execute the second function, wherein the first function differs from the second function, and wherein the selecting includes automatically selecting, when a plurality of device objects corresponding to the second function of the output apparatus, which is the same as the selected first device object, exists, the device object to which an attribute indicating that the output apparatus is generally used has been set as the second device object from among the plurality of device objects.

* * * * *